United States Patent

[11] 3,547,148

[72] Inventor Moshe Drori
 East Twickenham, England
[21] Appl. No. 703,332
[22] Filed Feb. 6, 1968
[45] Patented Dec. 15, 1970
[73] Assignee C.A.V. Limited, Acton
 London, England
[32] Priority Feb. 20, 1967
[33] Great Britain
[31] No. 7934

[54] DELIVERY VALVES
 2 Claims, 1 Drawing Fig.
[52] U.S. Cl. .................................................. 137/540,
 123/139, 141/116, 222/571
[51] Int. Cl. ........................................................F16k 15/00,
 F02m 39/02
[50] Field of Search........................................... 137/540,
 508; 123/139(DP); 141/115, 116, 117; 222/571

[56] References Cited
 UNITED STATES PATENTS

| 2,374,614 | 4/1945 | Nichols | 123/139(DP) |
| 2,421,475 | 6/1947 | Beeh | 123/139(DP) |
| 2,612,840 | 10/1952 | Lasley | 123/139(DP) |
| 2,729,169 | 1/1956 | Nichols | 123/139(DP) |
| 3,272,218 | 9/1966 | Johnson | 137/540X |

FOREIGN PATENTS

| 439,002 | 9/1948 | Italy | 123/139(DP) |

Primary Examiner—William F. O'Dea
Assistant Examiner—David J. Zobkiw
Attorney—Holman, Glascock, Downing and Seebold ABSTRACT: A delivery valve primarily for the use in a liquid fuel pumping apparatus and incorporating a piston which is slidable between predetermined limits, with the piston being situated in an outlet of the apparatus and having a conduit formed therein. A resiliently loaded valve member is provided for controlling the flow of fuel through said conduits whereby at the end of the delivery of fuel by the apparatus the piston will move in the reverse direction to allow a predetermined volume of fuel to be unloaded from the pipeline connecting the outlet with an injection nozzle.

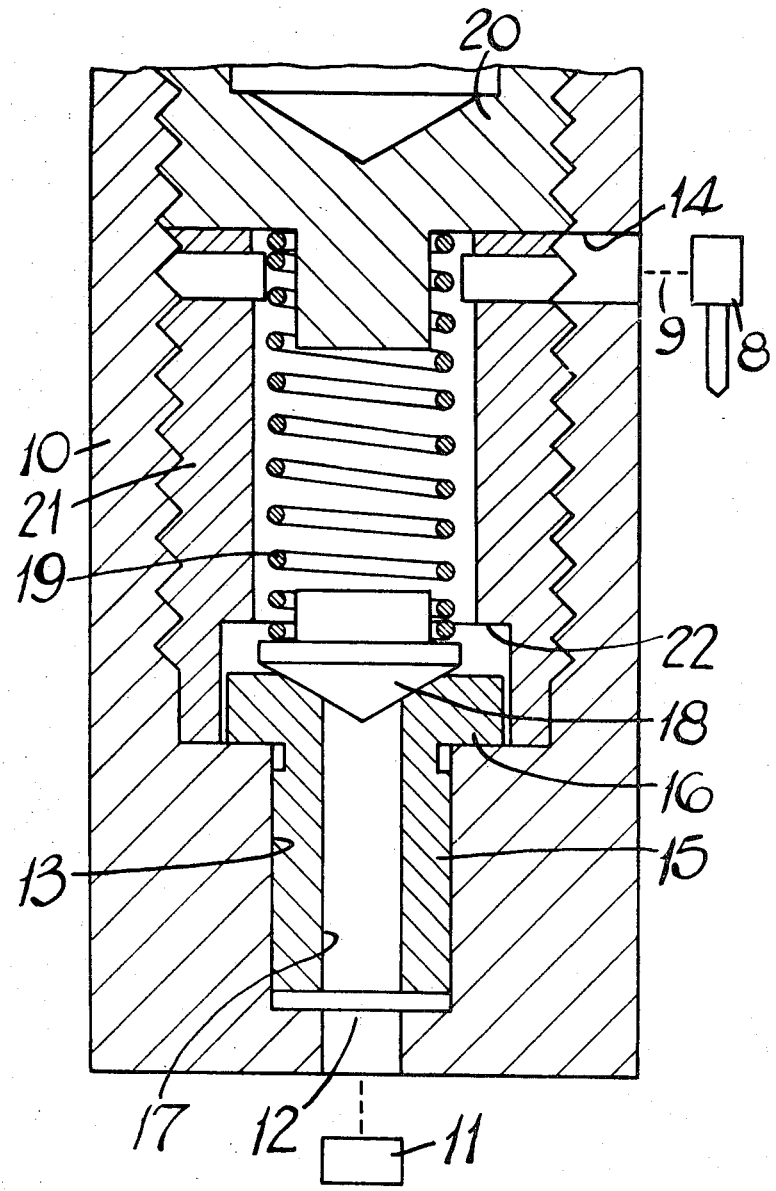

DELIVERY VALVES

BACKGROUND OF THE INVENTION

This invention relates to delivery valves of the kind intended to be mounted within an outlet passage of a liquid fuel pumping apparatus intended to supply fuel to an internal combustion engine, and the object of the invention is to provide such a valve in a simple and convenient form.

SUMMARY OF THE INVENTION

A valve in accordance with the invention comprises a body part having a stepped bore, an outlet communicating with the narrower portion of the bore and a passage communicating with the wider portion of the bore and a pipe leading to a fuel injection nozzle, respectively, a cylindrical member slidable in the narrower portion of the bore provided with a through conduit and an end portion extending into the wider portion of the bore, a seat on the end portion of the member about the conduit, a conical valve element cooperable with the seat for opening and closing the conduit, spring means normally maintaining said valve element on the seat, the step between the wider and narrower portions of the bore constituting a first stop, means within the wider portion of the bore spaced axially from the step constituting a second stop and means on said end portion of the cylindrical member engageable with the first and second stops, the arrangement being such that at the commencement of fuel delivery, the cylindrical member and valve element move in opposition to the spring means whereby fuel is expelled from the wider portion of the bore through the passage to pressurize the pipe and upon the cylindrical member engaging the second stop, further movement of the cylindrical member is arrested and the fuel flow raises the valve element from the seat so that a measured quantity of fuel flows through the conduit in the cylindrical member to the passage and upon cessation of fuel delivery, the spring means urges the valve element onto the seat to close the conduit and together with the pressure of fuel within the passage moves the cylindrical member so that it engages the first stop.

BRIEF DESCRIPTION OF THE DRAWINGS

One example of a delivery valve in accordance with the invention will now be described with reference to the accompanying drawing in which the sole view is partly in elevation and partly in cross section.

DETAILED DESCRIPTION OF THE INVENTION

This delivery valve is mounted within a body part 10 of a liquid fuel pumping apparatus which includes an injection pump 11, although for the purpose of illustration the injection pump is shown separately. The apparatus is provided with an outlet port 12 which opens into an outlet passage and the latter is defined in part by a cylindrical bore 13 which is of stepped form. The wider end of the bore 13 communicates with a fuel connection (not shown) by way of a passage 14. The fuel connection is adapted to be connected to one end of a pipe indicated at 9, and the other end thereof is connected to a fuel injection nozzle 8. Within the narrower end of the bore 13 there is mounted a cylindrical member 15 having an integral flange 16 formed at its end remote from the injection pump 11. Within the member is formed a conduit 17 through which fuel flows to the engine during a delivery stroke of the apparatus.

Defined about the conduit 17 is a seating with which cooperates a conical valve element 18. The element 18 is loaded into contact with the seating by means of a coiled compression spring 19 one end of which bears upon the element and the other end of which bears upon a plug 20 secured within the wider end of the bore 13. The step in the bore 13 cooperates with the flange 16 to limit the movement of the member 15 under the influence of the spring 19. Moreover, mounted within the wider portion of the bore 13 is a sleeve member 21 upon the internal periphery of which is defined a step 22. The step 22 together with the flange 16 acts to limit the movement of the member 15 against the action of the spring.

In use, at the commencement of the delivery of fuel by the apparatus, the member 15 together with the valve 18 move in opposition to the action of the spring 19. During this movement, fuel is expelled from the wider portion of the bore 13 and flows through the passage 14 thus pressurizing the pipe 9 and injection system to a pressure slightly below the nozzle opening pressure. When the flange 16 contacts the step 22, further movement of the member 15 is prevented, but the continued flow of fuel from the apparatus causes the valve element 18 to be lifted from the seating and a measured quantity of fuel flows through the conduit 17 to the passage 14. When the delivery of fuel by the apparatus ceases, arrangements within the apparatus reduce the pressure and the valve element immediately closes the conduit 17 and the action of the spring 19 together with the pressure of fuel within the passage 14, moves the member 15 to the position in which it is shown in the drawing. During this movement, a predetermined quantity of fuel flows out of the passage 14 and the associated pipe thereby to relieve the pressure therein. An identical quantity of fuel is displaced from the narrower end of the bore 13 and flows into the port 12.

It will be appreciated that the delivery valve may be mounted within a separate body part so that it can be mounted on a pumping apparatus which does not incorporate delivery valves in its construction.

By the arrangement described, certain difficulties in the manufacture of conventional delivery valves are overcome. For instance, it is not necessary to ensure that the seating for the valve element 18 is concentric with the narrower portion of the bore 13. To vary the degree of unloading, the depth of the step 22 on the sleeve member 21 is altered with all other components remaining the same.

I claim:

1. A delivery valve for use in a fuel pump for supplying fuel to an internal combustion engine, including a body part having a stepped bore, an outlet communicating with the narrower portion of the bore and a passage communicating with the wider portion of the bore and a pipe leading to a fuel injection nozzle, respectively, a cylindrical member slidable in the narrower portion of the bore provided with a through conduit and an end portion extending into the wider portion of the bore, a seat on the end portion of the cylindrical member about the conduit, a conical valve element cooperable with the seat for opening and closing the conduit, spring means normally maintaining the valve element on the seat, the step between the wider and narrower portions of the bore constituting a first stop, means within the wider portion of the bore spaced axially from the step constituting a second stop, and means on said end portion of the cylindrical member engageable with the first and second stops, the arrangement being such that at the commencement of fuel delivery, the cylindrical member and valve element move in opposition to the spring means whereby fuel is expelled from the wider portion of the bore through the passage to pressurize the pipe and upon the cylindrical member engaging the second stop, further movement of the cylindrical member is arrested and the fuel flow raises the valve element from the seat enabling a measured quantity of fuel flow through the conduit in the cylindrical member to the passage, and upon cessation of fuel delivery, the spring means urges the valve element onto the seat to close the conduit and together with the pressure of fuel within the passage moves the cylindrical member to engage the first stop.

2. A delivery valve for use in a fuel pump for supplying fuel to an internal combustion engine, and including a body part having a stepped bore, an outlet communicating with the narrower portion of the bore and a passage communicating with the wider portion of the bore and a pipe leading to a fuel injection nozzle, respectively, a cylindrical member slidably mounted within the narrower portion of the stepped bore, said cylindrical member having a flange at one end extending into the wider portion of the bore and a through conduit, a seat in said end about the conduit, a conical valve element cooperable with the seat for opening and closing the conduit, means closing the wider portion of the stepped bore, spring means biased between said closing means and said conical valve element normally maintaining the valve element on the seat, a sleeve positioned in the wider portion of said bore surrounding the spring means and having an end portion engaging the step between the wider and narrower portions of the bore, the internal periphery of the sleeve adjacent said end portion being provided with a step, the step of the sleeve serving to limit the movement of the cylindrical member into the wider portion of the bore and the arrangement being such that at the commencement of fuel delivery, the cylindrical member and valve element move in opposition to the spring means whereby fuel is expelled from the wider portion of the bore through the passage to pressurize the pipe and upon the flange of the cylindrical member engaging the step of the sleeve, further movement of the cylindrical member is arrested and the fuel flow raises the valve element from the seat so that a measured quantity of fuel flows through the conduit in the cylindrical member to the passage and upon cessation of fuel delivery, the spring means urges the valve element onto the seat to close the conduit and together with the pressure of fuel within the passage moves the cylindrical member so that the flange engages the step between the wider and narrower portions of the bore.